United States Patent
Ali et al.

(10) Patent No.: US 12,450,178 B2
(45) Date of Patent: Oct. 21, 2025

(54) AGGREGATION OF MULTIPLE MEMORY MODULES FOR A SYSTEM-ON-CHIP

(71) Applicant: Avago Technologies International Sales Pte. Limited, Singapore (SG)

(72) Inventors: Anwar Ali, San Jose, CA (US); James Church, West Linn, OR (US); Gokulnath Sulur, Santa Clara, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 92 days.

(21) Appl. No.: 18/480,832

(22) Filed: Oct. 4, 2023

(65) Prior Publication Data
US 2024/0403235 A1    Dec. 5, 2024

Related U.S. Application Data

(60) Provisional application No. 63/505,928, filed on Jun. 2, 2023.

(51) Int. Cl.
*G06F 12/00*    (2006.01)
*G06F 13/16*    (2006.01)
*G06F 13/40*    (2006.01)

(52) U.S. Cl.
CPC ...... *G06F 13/1657* (2013.01); *G06F 13/1678* (2013.01); *G06F 13/4068* (2013.01)

(58) Field of Classification Search
CPC ............. G06F 13/1657; G06F 13/1678; G06F 13/4068; H10B 12/00; H10B 20/00; H01L 23/00; H01L 24/00; H01L 25/00
See application file for complete search history.

(56) References Cited

U.S. PATENT DOCUMENTS

| | | |
|---|---|---|
| 9,911,465 B1 | 3/2018 | Camarota et al. |
| 10,545,860 B2 | 1/2020 | Malladi et al. |

(Continued)

FOREIGN PATENT DOCUMENTS

| | | |
|---|---|---|
| EP | 3497722 B1 | 2/2021 |
| EP | 3855442 A1 | 7/2021 |

(Continued)

OTHER PUBLICATIONS

European Patent Office, Extended Search Report, Application No. 24179324.9, Oct. 15, 2024, 12 pages.

*Primary Examiner* — Shawn X Gu
(74) *Attorney, Agent, or Firm* — Quarles & Brady LLP (57) ABSTRACT

A system includes a substrate comprising a first circuit. The system also includes an integrated circuit formed in a first die disposed on the substrate. The integrated circuit includes at least a processor, a controller, and a first memory interface. The first memory interface is located in a first edge of the first die and is configured to couple to the first circuit. The system also includes a first buffer circuit formed in a second die disposed on the interposer substrate adjacent to the first edge of the first die. The first buffer circuit includes a second memory interface configured to couple to the first connection circuit. The system further includes multiple memory modules disposed on the second die. Each of the multiple memory modules at least partially share the second memory interface to communicate with the integrated circuit.

19 Claims, 5 Drawing Sheets

(56) References Cited

U.S. PATENT DOCUMENTS

| | | | |
|---|---|---|---|
| 10,707,196 B2 | 7/2020 | Kim et al. |
| 2018/0358313 A1 | 12/2018 | Newman et al. |
| 2020/0098730 A1 | 3/2020 | Keeth |
| 2021/0224195 A1 | 7/2021 | O |
| 2021/0225430 A1 | 7/2021 | O |
| 2021/0240615 A1 | 8/2021 | Sohn et al. |
| 2021/0287735 A1 | 9/2021 | O et al. |
| 2021/0304802 A1 | 9/2021 | Lee |
| 2022/0414030 A1 | 12/2022 | Malladi et al. |

FOREIGN PATENT DOCUMENTS

| | | |
|---|---|---|
| KR | 20210081534 A | 7/2021 |
| WO | WO-2022115167 A2 * | 6/2022 |

* cited by examiner

AGGREGATION OF MULTIPLE MEMORY MODULES FOR A SYSTEM-ON-CHIP

CROSS-REFERENCES TO RELATED APPLICATIONS

This application claims priority of a U.S. provisional application No. 63/505,928, filed on Jun. 2, 2023, commonly assigned and incorporated by reference herein for all purposes.

FIELD OF INVENTION

The subject technology is directed to semiconductor integrated circuits and methods of manufacturing.

BACKGROUND OF THE INVENTION

A System-on-Chip (SoC) is an integrated circuit that combines various electronic components and functionalities onto a single chip. It is designed to provide a complete system solution within a compact package, typically for use in electronic devices such as smartphones, tablets, IoT devices, and embedded systems. SoC technology has revolutionized the semiconductor industry by enabling highly integrated and efficient systems with reduced power consumption. Various specific functional systems can be built using a SoC die coupled with multiple discrete high-performance memory (HBM) dies. The HBM die typically connects to the SoC via a memory interface through an interposer or package.

Typically, each memory interface in an SoC involves numerous data paths that connect to the SoC die. These data paths facilitate the transfer of data between the SoC and the memory, including read and write operations. Additionally, the memory interface includes address lines that link specific bits to designated memory cells, as well as control signals for configuring and interacting with the memory module. Allocating a specific area on the SoC die, typically located at one of the peripheral edges, is necessary to establish the connection with each memory die and form the memory interface. However, incorporating multiple High Bandwidth Memory (HBM) modules requires a larger periphery of the SoC die to accommodate the increasing number of memory interfaces. This results in a larger SoC die size, which translates to higher costs. Therefore, there is a need for an enhanced system and method that enables the coupling of an SoC to multiple discrete high bandwidth memory modules while minimizing the impact on size and cost.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The subject technology pertains to semiconductor integrated circuits and their manufacturing methods. Specifically, it introduces an integrated circuit that comprises a system-on-chip (SOC) die connected to a first memory interface via a connection circuit located on an interposer substrate. On the same interposer substrate, there is a buffer die housing a second memory interface. Multiple memory modules are positioned on the buffer die, and these memory modules utilize the shared second memory interface to establish communication with the system-on-chip. This arrangement allows the system-on-chip to maintain a compact size, resulting in cost savings, while simultaneously increasing its memory capacity by incorporating additional memory modules with high bandwidth. It is important to note that there are other alternative embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the subject technology is not intended to be limited to the embodiments presented, but is to be accorded the widest scope consistent with the principles and novel features disclosed herein.

In the following detailed description, numerous specific details are set forth in order to provide a more thorough understanding of the subject technology. However, it will be apparent to one skilled in the art that the subject technology may be practiced without necessarily being limited to these specific details. In other instances, well-known structures and devices are shown in block diagram form, rather than in detail, in order to avoid obscuring the subject technology.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect includes a system involving a system-on-chip coupled with multiple discrete memory modules. The system also includes a substrate may include a first circuit. The system also includes a second circuit formed in a first die disposed on the substrate, the second circuit may include at least a processor and a first memory interface, the first memory interface being disposed in a first edge of the first die and being configured to couple the processor with the first circuit. The system also includes a third circuit formed in a second die disposed on the substrate adjacent to the first edge of the first die, the third circuit may include a second memory interface configured to couple to the first circuit. The system also includes multiple memory modules disposed on the second die, each of the multiple memory modules at least partially sharing the second memory interface to communicate with the processor via the first circuit and the first memory interface. The substrate is an interposer substrate, which is an electrical interface that redirects or "reroutes" a connection from one standard form factor to another. In the context of semiconductor and microelectronics packaging, an interposer is typically a thin slice of silicon (or other material) with circuits that connect chips above it to circuits below it. When used with the High Bandwidth Memory (HBM) technology, for instance, the interposer serves as a bridge between the HBM stacks and the processor (like a GPU). The interposer contains fine-grain routing, which facilitates the dense connections needed for the HBM stacks and the processor to communicate.

Implementations may include one or more of the following features. The system where the second circuit may include a central processing unit (CPU). The second circuit may include a graphics processing unit (GPU). The second circuit may include an artificial intelligence (AI) accelerator. The first circuit may include a connection interposer and a connection trace. The second circuit formed in the first die may include a system-on-chip. The multiple memory modules may include two or more memory dies being disposed laterally side-by-side and/or vertically one-on-another on the second die. The second circuit may include a third memory interface disposed in a second edge of the first die. The system may include a fourth circuit formed in a third die, the fourth circuit may include a fourth memory interface, the third die being disposed on the substrate adjacent to the second edge of the first die, the substrate may include a fifth circuit configured to couple the fourth memory interface with the third memory interface. The system may include multiple memory modules disposed on the third die, the multiple memory modules at least partially sharing the fourth memory interface to communicate with the second circuit via the fifth circuit and the third memory interface. The first memory interface is configured to support 128 Gb/s or higher bandwidth. The second memory interface may include a number of data paths for communicating data, address, and control signals, where the number of data paths is smaller than a sum of data paths for the multiple memory modules and may include a subset of data paths for commonly communicating with the multiple memory modules.

Another general aspect includes an integrated circuit. The integrated circuit also includes a substrate may include a first circuit. The circuit also includes a second circuit may include at least a first memory interface, the second circuit being configured to be a first die disposed on the substrate, where the first memory interface is configured to couple to the first circuit. The circuit also includes a third circuit may include a second memory interface, the third circuit being configured to be a second die disposed on the substrate adjacent to the first die, where the second memory interface is configured to couple to the first circuit. The circuit also includes multiple memory circuits disposed on the second die, each of the multiple memory circuits at least partially sharing the second memory interface to communicate with the second circuit via the first circuit and the first memory interface. In an embodiment, the first die is configured as a System-on-Chip (SOC) chip. A SOC chip is generally referred to an integrated circuit (IC) that integrates most components of a computer or other electronic system into a single chip. It combines various discrete components such as processors and specialized hardware accelerators into one unified architecture, aiming to deliver more optimized and space-efficient solutions. In an embodiment, the second die is configured to be a buffer chip. A buffer chip is an electronic component designed to manage, modify, or amplify the voltage levels of signals that pass through it. The primary purpose of a buffer is to serve as an interface between two circuits with differing electrical characteristics, ensuring signal integrity and preserving the properties of the original signal. Buffer chips can be found as standalone integrated circuits (ICs) or as part of larger ICs where they perform their role alongside other functionalities.

Implementations may include one or more of the following features. The integrated circuit where the first die is configured as a system-on-chip may include at least one integrated circuit of CPU, GPU, artificial intelligence accelerator, computing system, networking system, and autonomous control system. The multiple memory circuits may include two or more memory modules being disposed laterally side-by-side and/or vertically one-on-another on the second die. Each of the multiple memory circuits may include a high bandwidth memory (HBM) module capable of supporting 128 Gb/s or higher bandwidth. The second circuit may include a third memory interface. The integrated circuit may include a fourth circuit may include a fourth memory interface, the fourth circuit being configured to be a third die disposed on the substrate adjacent to the first die, the substrate may include a fifth circuit configured to couple the fourth memory interface to the third memory interface. The integrated circuit may include multiple memory circuits disposed on the third die, each of the multiple memory circuits at least partially sharing the fourth memory interface to communicate with the second circuit via the fifth circuit and the third memory interface.

Yet another general aspect includes a method of coupling a system-on-chip circuit to separate memory circuits. The method also includes providing a substrate may include a first circuit. The method also includes providing a second circuit may include a first memory interface. The method also includes disposing the second circuit on the substrate, the first memory interface being configured to couple to the first circuit. The method also includes providing at least a third circuit may include a second memory interface, the second memory interface may include a first number of data paths. The method also includes disposing the third circuit on the substrate, the third circuit being located adjacent to the second circuit, the second memory interface being configured to couple to the first circuit. The method also includes disposing two or more memory circuits laterally side-by-side or vertically one-on-another on the third circuit, each memory circuit may include a second number of data paths. The method also includes coupling the second number of data paths for each memory circuit to the first number of data paths in the second memory interface to allow each memory circuit communicating with the second circuit, the first number of data paths being smaller than a sum of the second number of data paths. Each of the first number of data paths is configured with a higher data rate than each data path of the second number of data paths in each memory circuit.

When an element is referred to herein as a "die", it is to be understood that it refers to the individual silicon wafer that contains an integrated circuit or a specific functional unit of one or more integrated circuits. During the semiconductor manufacturing process, multiple copies of the same integrated circuit or functional units are fabricated on a single silicon wafer. Each of these individual copies is known as a die. For example, a die consists of various electronic components, such as transistors, resistors, capacitors, and interconnects, that are etched or deposited onto the silicon substrate. For another example, a die may contain a single functional unit such as a processor, controller, memory, and interface that is formed on the single silicon wafer. For another example, a die may contain a system of multiple functional units all integrated on a single silicon wafer, such as a system-on-chip die.

A system-on-chip (SOC) die is an integrated circuit that combines various electronic components and functionalities onto a single chip. The integrated circuit is designed to provide a complete system solution within a compact package, typically for use in electronic devices such as smartphones, tablets, IoT devices, and embedded systems. The SOC die includes several components that may vary depending on the specific application and requirements. Commonly it includes a processor, for example, a central processing unit (CPU), responsible for executing instructions and performing computations. It may consist of one or multiple processor cores, with each core capable of executing instructions independently. In another example, the processor may be provided as a graphics processing unit (GPU) responsible for handling graphical computations and accelerating graphics-intensive tasks. Basically, the SOC die may also include Input/Output (I/O) Interfaces to enable communication with external devices and peripherals. This includes interfaces like USB, HDMI, Ethernet, Wi-Fi, Bluetooth, and various sensor interfaces. These interfaces facilitate data transfer, connectivity, and interaction with the external environment. In general, SOC die may also incorporate various types of memory to store data and instructions. SOC die may also include Analog-to-Digital Converter (ADC) and Digital-to-Analog Converter (DAC) to convert analog signals to digital and vice versa. This enables the SOC to interface with analog sensors and actuators, allowing it to interact with the physical world. Additionally, SOC die may include internal bus architectures that enable communication and data transfer between various components within the chip. These buses facilitate efficient and high-speed data exchange while managing the flow of information between different subsystems.

In addition to the components integrated within the SOC itself, a SOC design may also couple to multiple discrete memory chips to fulfill the memory requirements of the system. These memory chips often are utilized to expand the memory capacity and provide additional storage options. Especially, high bandwidth memory (HBM) modules are employed to address the growing demand for higher memory performance in the SOC configured as modern computing systems, such as graphics processing units (GPUs), high-performance computing (HPC) systems, and advanced AI accelerators. HBM is a high-speed computer memory interface for 3D-stacked (vertically one-on-another) dynamic random-access memory (DRAM) which achieves high bandwidth while consuming less power in a considerably smaller form factor than DDR (Double Data Rate) memory solutions, such as DDR4 or GDDR5. HBM memory stacks are interconnected using TSVs. These are vertical electrical connections passing completely through a silicon wafer or die. The HBM stacks are placed on a substrate adjacent to a processor (for example, a GPU on a SOC die). They're interconnected via an interposer—a silicon layer with routing that connects the processor and the HBM stacks. This closeness reduces data travel distance, further lowering latency and power consumption. Key features and benefits of HBM include increased bandwidth allowing parallel data access and reducing memory latency with reduced power consumption due to shorter data paths and lower signal capacitance. HBM is designed to be scalable, allowing for increased memory capacity and bandwidth by adding more memory stacks to the design. This scalability is beneficial for applications with high memory demands, such as GPU computing and deep learning.

The interface between the SOC and the HBM module is a critical element in enabling efficient communication and data transfer between these components. The specific interface used may depend on the implementation and the technologies involved. One commonly used interface for connecting an SOC die and an HBM die is the high bandwidth memory interface providing high-speed and high-bandwidth data pathway for data transfer between the SOC die and the HBM die and providing separate command and address buses for transmitting control signals and memory addresses from the SOC to the HBMs. The SOC die may include a memory controller to manage the communication and data transfer between the SOC and multiple HBM modules.

Figure 1:
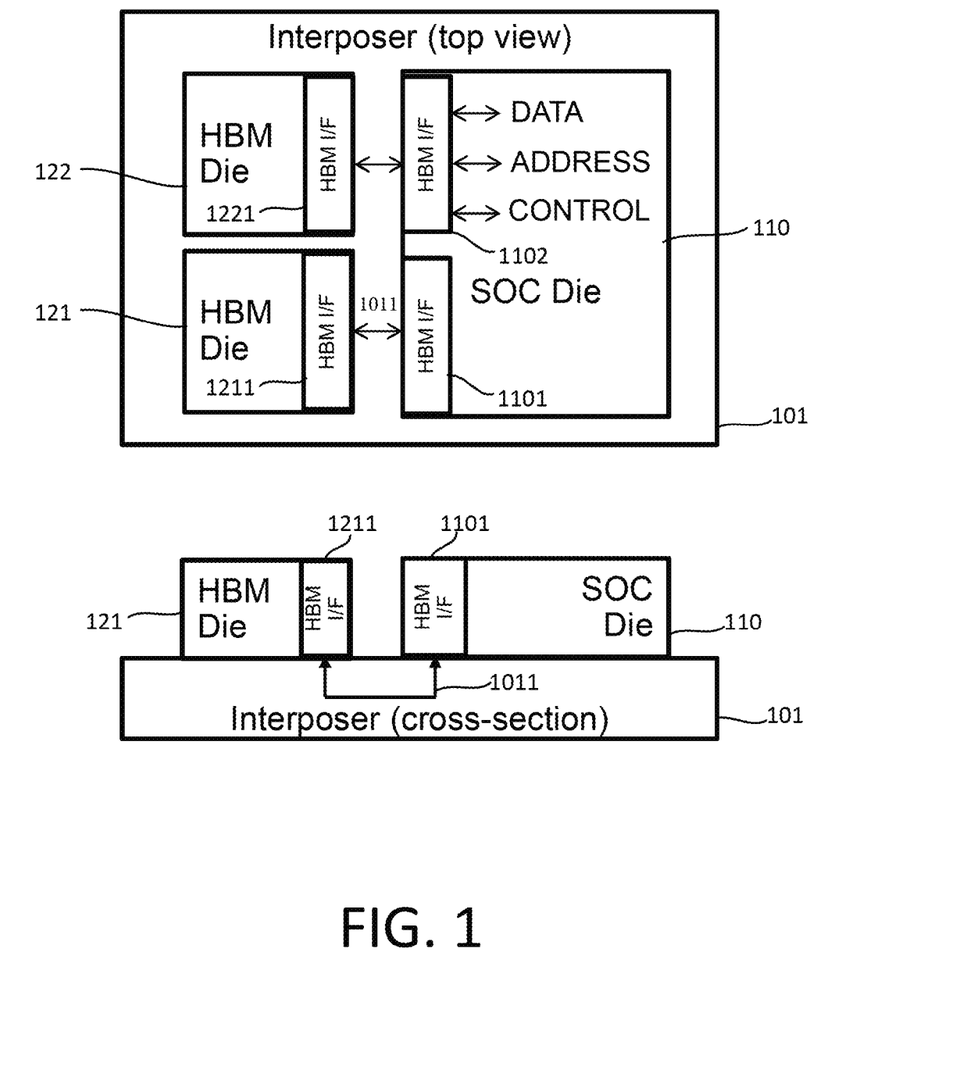
FIG. 1 is a schematic diagram illustrating both top-view and cross-section view of a system-on-chip (SOC) die coupled with two high-bandwidth memory (HBM) dies in a conventional configuration.

FIG. 1 is a schematic diagram illustrating both top-view and cross-section view of a SOC die coupled with two HBM dies in a conventional configuration. Typically, SOC die 110 is disposed on a substrate 101 and two HBM dies 121 and 122 are also disposed on the substrate 101. SOC die 110 comprises a first memory interface (HBM I/F) 1101 and a second memory interface 1102. Both memory interfaces are disposed at a first edge of the periphery of SOC die 110. For the two HBM dies, 121 and 122, each also includes a HBM interface, 1211 and 1221. The two HBM dies, 121 and 122, are located adjacent to the first peripheral edge of the SOC die 110, such that the HBM interface 1211 has a short physical distance from the HBM interface 1101 and the HBM interface 1221 also has a short physical distance from the HBM interface 1102. In an embodiment, the substrate 101 is an interposer substrate that includes one or more connection circuits containing a medium to reroute or redirect electrical connections. The traces or pathways on the interposer substrate are much finer than what's possible on typical printed circuit boards. The interposer substrate typically uses Si as a common material because of its compatibility with semiconductor processes, other materials can be used, such as organic or glass substrates. The pair of HBM interfaces, 1201 and 1211, are coupled by a first connection circuit 1011 built inside the interposer substrate 101 (see cross-section view of FIG. 1). The other pair of HBM interfaces, 1202 and 1221, are also coupled by another connection circuit (not visible in FIG. 1) embedded in the interposer substrate. In this example, two discrete HBM interfaces need to be formed in the SOC die to respectively couple two HBM interfaces for data communications between the SOC die and two discrete HBM dies. The two discrete HBM dies, 121 and 122, each with a finite dimension, accordingly, need to be disposed side-by-side adjacent to the first peripheral edge to keep the short physical distance between two corresponding HBM interfaces for facilitating the high-speed high-bandwidth data transfer.

Figure 2:
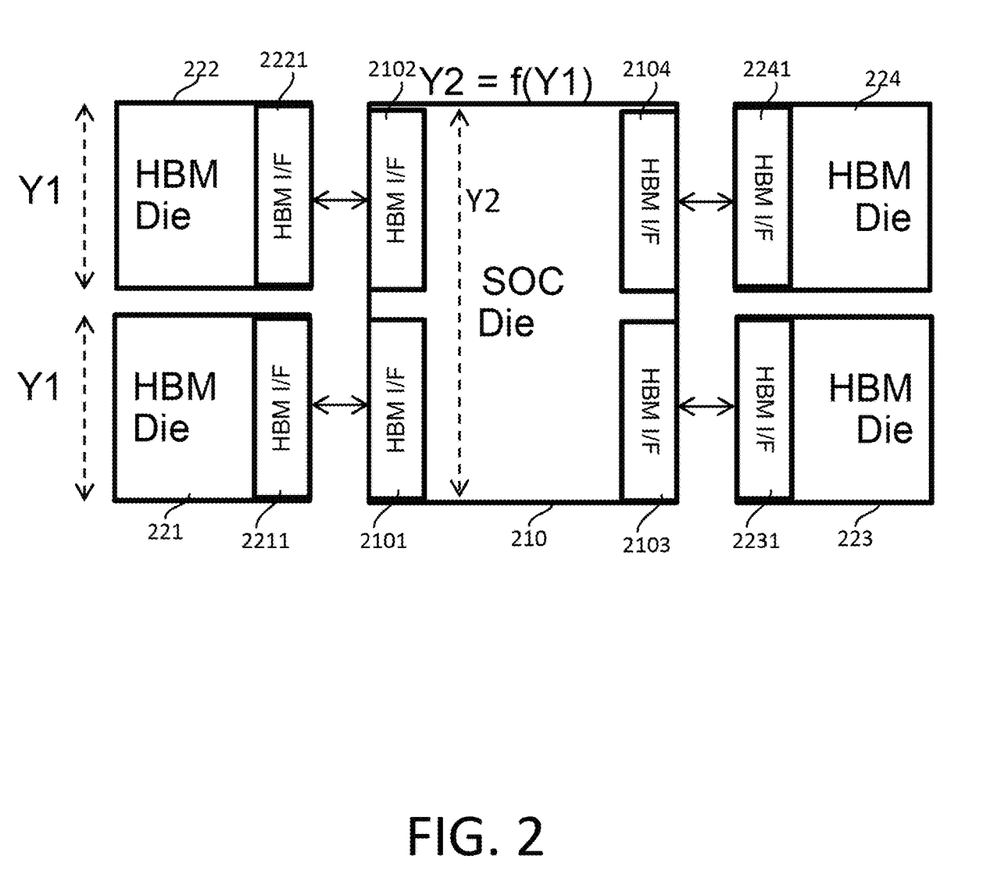
FIG. 2 is a schematic diagram illustrating a dimension correlation between the SOC die and each HBM die in the conventional configuration.

FIG. 2 is a schematic diagram illustrating a dimension correlation between the SOC die and each HBM die in the conventional configuration. FIG. 1 shows only two HBM dies coupled with the SOC die adjacent to one peripheral edge. FIG. 2 shows an example where the number of HBM dies increases from 2 to 4, a second peripheral edge of SOC die 210 is used to form another two HBM interfaces 2103 and 2104 for respectively coupling two HBM interfaces 2231 and 2241 of two additional HBM dies 223 and 224. This is basically the same configuration of coupling two HBM dies 221 and 222 to the SOC die 210 respectively via two pairs of HBM interfaces, e.g., 2101-2211 and 2102-2221.

Increasing number of HBM dies is often required either to increase system memory capacity, memory bandwidth, or both. Because of the finite dimension Y1 of each HBM module and associated HBM interface as well as a requirement to form a matching HBM interface on the SOC die to connect the corresponding HBM interface on each HBM module, adding HBMs requires the (first or second) peripheral edge dimension Y2 of the SOC die to grow as a function of the HBM module dimension Y1 and number of HBMs, i.e., Y2=f(Y1). For example, if the number of HBM dies increases from 4 to 6, the required peripheral edge dimension Y2 must increase to accommodate at least a third HBM die be coupled at each of the first and second peripheral edges of the SOC die based on the same configuration shown in FIG. 2. The limitation of the current method is that growing the size of the SOC die increases the cost.

Figure 3:
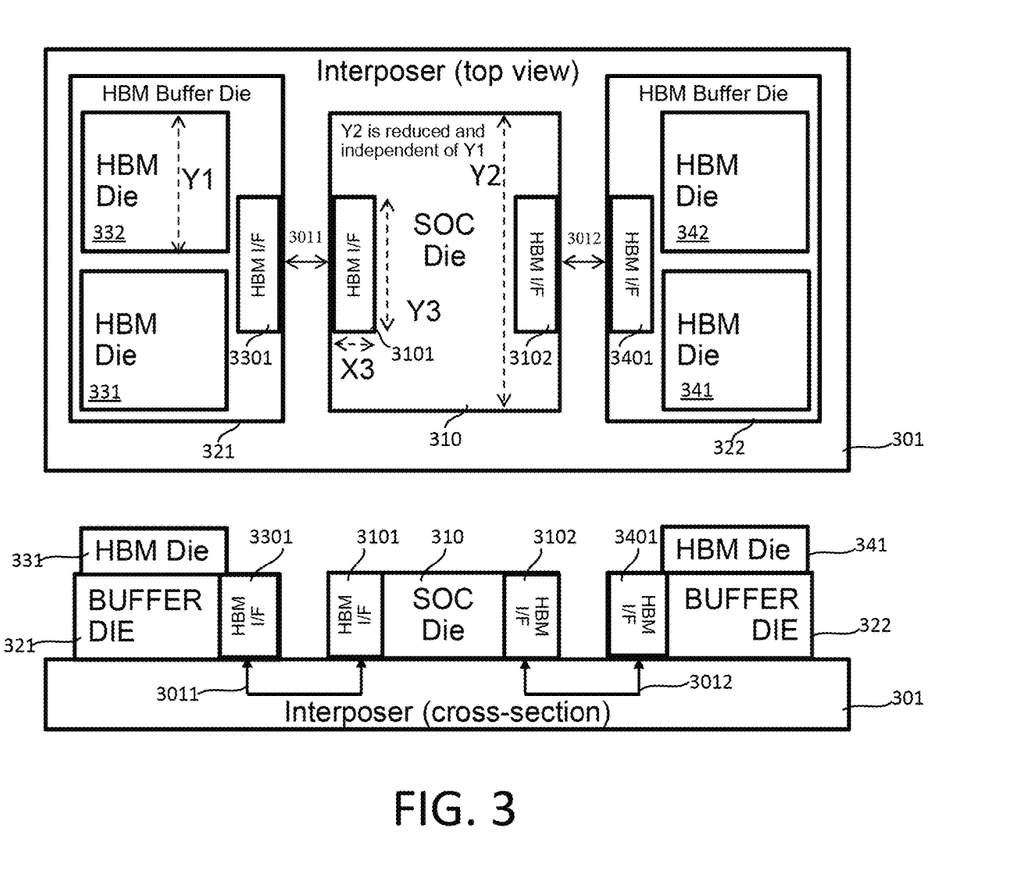
FIG. 3 is a schematic diagram illustrating both top-view and cross-section view of an integrated circuit comprising a SOC die coupled with four HBM dies according to an embodiment of the subject technology.

FIG. 3 is a schematic diagram illustrating both top-view and cross-section view of an integrated circuit comprising a SOC die coupled with four HBM dies according to an embodiment of the subject technology. This diagram is merely an example, which should not unduly limit the scope of the claims. One of ordinary skill in the art would recognize many variations, alternatives, and modifications.

In an embodiment, in addition to a first die 310 of an integrated circuit, provided as a SOC die (e.g., an integrated circuit on a chip), disposed on a substrate 301, a second die 321 (e.g., a circuit) is provided as a buffer chip and disposed also on the substrate 301 adjacent to a first peripheral edge of the first die 310. In an embodiment, substrate 301 is an interposer substrate. The buffer chip is generally referred to a chip containing all conductive traces or data lines for forming an interface circuitry which is used as a buffer or intermediate connection between two major circuits. The buffer chip is also used a base for supporting other circuits disposed (side-by-side) or stacked (one-on-another) on top of itself. As shown in FIG. 3, the first die 310 comprises a first memory interface 3101 formed in the first peripheral edge of the first die. The second die 321 comprises a second memory interface 3301 formed along a peripheral edge of the second die and adjacent to the first peripheral edge of the first die. The interposer substrate 301 comprises a first connection circuit 3011 embedded therein (see cross-section view of FIG. 3). The first connection circuit 3011 is configured to couple to the first memory interface 3101 in the first die 310 and the second memory interface 3301. Optionally, the first connection circuit 3011 comprises a first group of through-silicon vias (TSVs) (not shown) to establish vertical connections between a first group of surface contacts (not shown) on the second die 321 and a bunch of conductive traces embedded in the interposer substrate 301. The first connection circuit 3011 also comprises a second group of TSVs to connect between a second group of surface contacts on the first die 310 and the bunch of conductive traces embedded in the interposer substrate to establish matched coupling between the second memory interface 3301 and the first memory interface 3101.

Additionally, as shown in the cross-section view of FIG. 3, multiple memory modules can be disposed on the second die 321. In FIG. 3 the multiple memory modules include two high bandwidth memory (HBM) modules, 331 and 332, disposed side-by-side laterally on the second die 321. Each of the two HBM modules, also called HBM dies, is configured to at least partially share the second memory interface 3301 in the second die 321 for data/signal communication with the integrated circuit in the first die 310. In an embodiment, the second memory interface 3301 is configured to include a first number of data paths for communicating data, address, and control signals. Unlike the HBM dies shown in FIG. 1 and FIG. 2, each HBM die 331 or 332 does not need to include its own memory interface. Instead, the buffer circuit in the second die 321 is designed to include all surface contacts required for coupling each HBM die and all data paths required for directly connecting those surface contacts to the second memory interface 3301. In some embodiments, each HBM module needs a second number of data paths for coupling to the second memory interface to transfer data, address information, and control signals. The first number of data paths in the buffer circuit is aggregated to be smaller than the sum of second number of data paths for the multiple memory modules on the second die, while each data path of the first number of data paths supports higher bandwidth. In some embodiments, the first number of data paths comprises a single set of data paths for supporting communication for common address information and control signals for the multiple memory modules. The aggregations or consolidation of data paths in the second memory interface would lead to a reduced size and eliminate the need of multiple independent memory interfaces for the multiple HBM modules.

Accordingly, in the first die 310, the first memory interface 3101 can be redesigned with higher bandwidth and smaller number of data paths to match the second memory interface 3301. Thus, the dimensions or aspect ratio of the first memory interface 3101 can be optimized to X3 and Y3 (see FIG. 3) according to the floorplan of the integrated circuit in the first die 310, the data path aggregation for the multiple HBM dies on the second die 321, and the data rate. For example, the first memory interface 3101 is configured to support 128 GB/s or higher bandwidth that is scalable based on number of the multiple memory modules on the second die 321. The (X3, Y3) optimization of the first memory interface 3101 on the first die 310 would make the dimension Y2 (Y2>Y3) of the SOC die (at the first peripheral edge along which the first memory interface 3101 is positioned) decoupled from the dimension Y1 of each HBM die. In other words, the dimension of the SOC die can be independent of the number of HBM dies (disposed adjacent to the first peripheral edge of the SOC die). Therefore, the SOC die can be kept in a relatively compact size based on optimization of the floorplan of the integrated circuit and the associated first memory interface.

Optionally, as more HBM modules are added for coupling with the first (SOC) die 310, the integrated circuit in the first die 310 may include a third memory interface 3102 formed along a second peripheral edge of the first die 310. Accordingly, as shown in FIG. 3, a third die 322 is provided as a buffer circuit disposed also on the interposer substrate 301 adjacent to the second peripheral edge of the first die 310. The third die 322 comprises a fourth memory interface 3401 formed along a peripheral edge of third die adjacent to the second peripheral edge of the first die. The interposer substrate 301 also comprises a second connection circuit 3012 (see cross-section view of FIG. 3). The first connection circuit 3012 is configured to couple to the third memory interface 3102 in the first die 310 and the second memory interface 3401. Based on the third die 322, more HBM modules, 341 and 342, can be disposed on the third die. FIG. 3 shows that the two added HBM dies 341 and 342 are disposed side-by-side laterally on the third die 322. Each added HBM die does not have its own independent memory interface, instead, is coupled with the fourth memory interface 3401 in the third die 322 to establish data/signal communications with the integrated circuit in the first die 310. The fourth memory interface 3401 comprises an aggregated number of data paths for communicating data, address, and control signals, wherein the aggregated number of data paths is smaller than a sum of data paths for the multiple memory modules while each of the aggregated number of data paths supports higher bandwidth. The aggregated number of data paths comprises a single set of data paths for common address and control signals for the multiple memory modules. The SOC die 310 can still be kept in a relatively compact size to reduce its cost based on optimization of the floorplan of the integrated circuit and the associated first memory interface and third memory interface.

Figure 4:
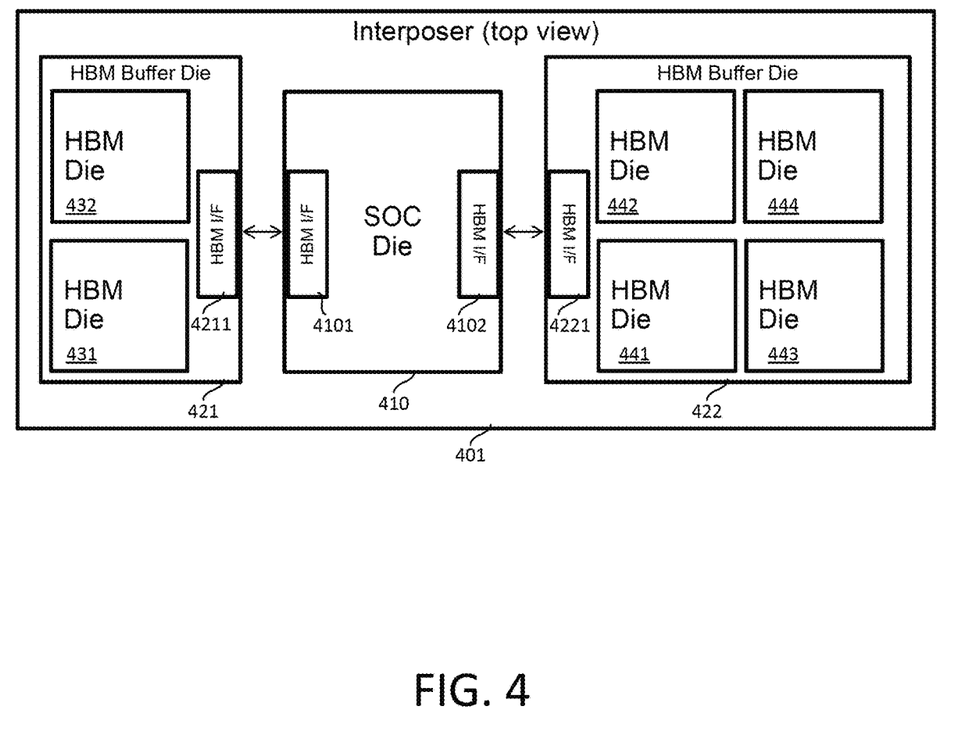
FIG. 4 is a schematic diagram illustrating a top view of a SOC die coupled with two HBM dies adjacent to a first peripheral edge and four HBM dies adjacent to a second peripheral edge according to an embodiment of the subject technology.

FIG. 4 is a schematic diagram illustrating a top view of a SOC die coupled with two HBM dies adjacent to a first peripheral edge and four HBM dies adjacent to a second peripheral edge according to an embodiment of the subject technology. This diagram is merely an example, which should not unduly limit the scope of the claims. One of ordinary skill in the art would recognize many variations, alternatives, and modifications. FIG. 4 shows that, based on the method for coupling a SOC die to multiple discrete memory modules proposed in FIG. 3, unrestricted number of multiple memory modules can be added via a buffer circuit to use an aggregated memory interface to couple with the SOC die from at least one peripheral edge. In a specific example of FIG. 4, the SOC die 410 comprises a first memory interface 4101 formed along a first peripheral edge thereof. A second die 421 is provided as a first buffer circuit comprising a second memory interface 4211 disposed adjacent to the first peripheral edge of the first die 410. Both the first die, SOC die 410, and the second die 421 are disposed on an interposer substrate 401. Two HBM modules are added, 431 and 432 side-by-side, on the second die 421. The two HBM modules are able to communicate with the SOC die using the second memory interface 4211 which is coupled to the first memory interface via a connection circuit in the interposer substrate.

As shown in FIG. 4, the same SOC die 410 also comprises a third memory interface 4102 formed along a second peripheral edge. A third die 422 is provided as a second buffer circuit comprising a fourth memory interface 4221 disposed adjacent to the second peripheral edge of the first die 410. The third die 422 is disposed on the interposer substrate with the fourth memory interface 4221 adjacent to the third memory interface 4102 in the first die. Four HBM modules, 441, 442, 443, and 444, are added, all side-by-side laterally on the third die 422 and all use the aggregated fourth memory interface 4221 to communicate with the SOC die through another connection circuit inside the interposer substrate 401. Additional HBM modules can be added to either the second die or the third die in similar configurations, provided that the memory interfaces there are properly scaled in aggregated number of data paths and upgraded bandwidth. In some embodiments, the SOC die may comprise a memory controller that manages the communication and data transfer between the SOC integrated circuit and the HBM memory modules. The memory controller translates the SOC's memory requests into the appropriate commands and addresses for the HBM dies. For example, the four HBM modules coupled with the SOC die may offer a bandwidth range of around 128 GB/s to 160 GB/s. In another example, four second generation HBM modules coupled with the SOC die in a similar configuration may offer a bandwidth range approximately 256-320 GB/s.

Figure 5:
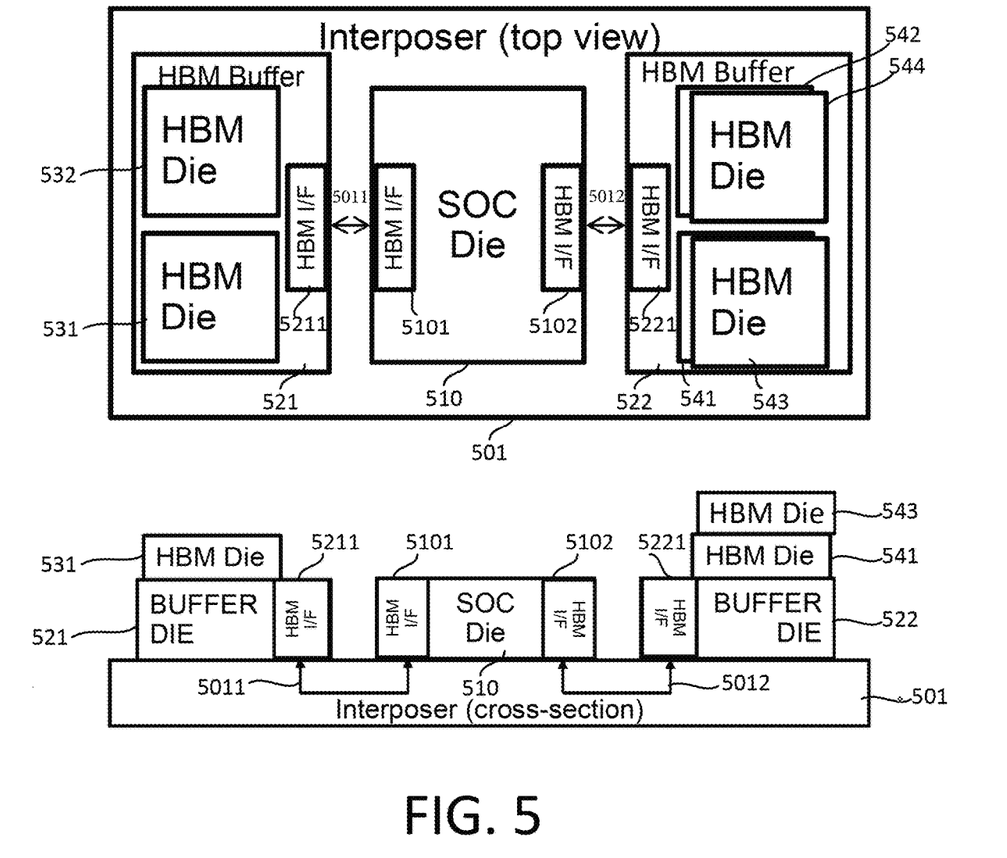
FIG. 5 is a schematic diagram illustrating both a top-view and cross-section view of a SOC die coupled with two HBM dies adjacent to a first peripheral edge and four HBM dies adjacent to a second peripheral edge according to another embodiment of the subject technology.

FIG. 5 is a schematic diagram illustrating both a top-view and cross-section view of a SOC die coupled with two HBM dies adjacent to a first peripheral edge and four HBM dies adjacent to a second peripheral edge according to another embodiment of the subject technology. FIG. 5 provided an alternative variation of the configuration of FIG. 4 for the SOC die to couple with multiple memory modules. In a specific embodiment, at least some of the multiple memory modules added on one of buffer die have stacked one another vertically. The multiple memory modules comprise at least two or more memory dies being disposed laterally side-by-side on the buffer die and/or two or more memory dies being stacked vertically on the buffer die.

In some embodiments, the HBM utilizes a stacked memory architecture where multiple memory dies are vertically stacked on top of each other. In some embodiment, the HBM interface facilitates communication with these stacked dies, enabling simultaneous access to a large memory capacity while minimizing the physical footprint. HBM interfaces can support multiple channels or data lanes, allowing for parallel data transfer and increased throughput. For example, the memory interfaces can have up to 1024 or 2048 data I/O pins, respectively. In some embodiments, the HBM interface may be integrated with a memory controller located in the SOC die, which is responsible for managing the data transfer between the processor of the SOC die and HBM dies. The memory controller handles tasks such as issuing read and write commands, managing data flow, and handling error correction. In some embodiments, HBM interfaces ay be designed to support scalability, allowing for the integration of multiple HBM stacks or higher-capacity HBM dies in future implementations. This scalability enables the system made by the SOC die coupled with multiple HBM dies to meet the growing demands of memory-intensive applications.

In some embodiments, FIG. 5 provides an integrated circuit comprising an interposer substrate (501) comprising a first connection circuit (5011). The integrated circuit also comprises a system-on-chip circuit (510) comprising at least a first memory interface (5101). The system-on-chip circuit (510) is disposed on the interposer substrate (501). The first memory interface (5101) is configured to couple to the first connection circuit (5011). In some embodiments, the integrated circuit also comprises a first buffer circuit (521) comprising a second memory interface (5211) configured to match the first memory interface (5101). The first buffer circuit (521) is also disposed on the interposer substrate (501) at a location adjacent to the system-on-chip circuit (510). In particular, the second memory interface (5211) formed on an edge portion of the first buffer circuit (521) is adjacent to the first memory interface (5101) formed on a first peripheral edge of the system-on-chip circuit (510). The second memory interface (5211) is configured to couple to the first connection circuit (5011) in the interposer substrate (501). The integrated circuit further comprises multiple memory circuits (e.g., HBM die 531 and HBM die 532) disposed on the first buffer circuit (521). Optionally, HBM die 531 is disposed laterally side-by-side with HBM die 532 on the first buffer circuit (521). Each of the multiple memory circuits at least partially shares the second memory interface (5211) to communicate with the system-on-chip circuit (510) via the first connection circuit (5011) and the first memory interface (5101).

In an embodiment, the system-on-chip circuit (510) comprises a central processing unit (CPU). In another embodiment, the system-on-chip circuit (510) comprises a graphics processing unit (GPU). In yet another embodiment, the system-on-chip circuit (510) comprises an artificial intelligence (AI) accelerator. In still another embodiment, the system-on-chip circuit (510) comprises at least one of high-performance computing system, high bandwidth networking system, autonomous driving system, machine learning system, and data-intensive computing system.

In some embodiments, as shown in FIG. 5, the system-on-chip circuit (510) also comprises a third memory interface (5102) disposed on a second peripheral edge of the system-on-chip circuit. The integrated circuit provided in FIG. 5 may also comprise a second buffer circuit (522) comprising a fourth memory interface (5221) formed on another edge portion of the second buffer circuit. The second buffer circuit (522) is also disposed on the interposer substrate (501) adjacent to the system-on-chip circuit (510). The interposer substrate (501) also comprises a second connection circuit (5012) configured to couple the fourth memory interface (5221) to the third memory interface (5102). The integrated circuit may also comprise multiple memory circuits (e.g., HBM die 541, HBM die 542, HBM die 543, and HBM die 544) disposed on the second buffer circuit (522). Some of the multiple memory circuits (e.g., HBM die 541 and HBM die 542) are disposed laterally side-by-side on the second buffer circuit (522). Some of the multiple memory circuits (e.g., HBM die 541 and HBM die 543) are stacked vertically on the second buffer circuit (522). Each of the multiple memory circuits at least partially shares the fourth memory interface (5221) to communicate with the system-on-chip circuit (510) via the second connection circuit (5012) and the third memory interface (5102).

In some embodiments, FIG. 5 also provides a method of coupling a system-on-chip circuit to separate memory circuits. The method comprises a step of providing a substrate (501) comprising a first circuit (5011). Optionally, the substrate is an interposer substrate. The first circuit is an electrical connection circuit including a plurality of conductive traces embedded in the substrate coupled via one or more interposers such as through-silicon vias (TSVs) to at least two sets of surface contacts disposed at two discrete locations. The method also comprises a step of providing a second circuit (51) comprising a first memory interface (5101). Optionally, the second circuit is configured to be a system-on-chip. The first memory interface (5101) is formed along a first edge of the system-on-chip (510).

The method also comprises a step of disposing the second circuit (510) on the substrate (501). The first memory interface (5101) is configured to couple to the first circuit (5011). Optionally, the second circuit 510 is the system-on-chip configured to be disposed at location on the interposer substrate (501) such that the first memory interface (5101) is coupled to the first set of surface contacts on the interposer substrate (501) to connect with the first circuit (5011).

The method further includes a step of providing at least a third circuit (521) comprising a second memory interface (5211). Optionally, the third circuit is configured to be a buffer chip, i.e., a chip contains all conductive traces or data lines for supporting the second memory interface (5211) which is used as a buffer or intermediate connection between two major circuits. The buffer chip is also a base for supporting other circuits disposed (side-by-side) or stacked (one-on-another) on top of itself. Optionally, the second memory interface (5211) is formed along an edge portion of the buffer chip (521). The method also includes a step of disposing the buffer circuit (521) on the interposer substrate (501). Optionally, the buffer circuit (521) is located adjacent to the system-on-chip circuit (510) so that the second memory interface (5211) at the edge portion of the buffer chip (521) is adjacent to the first memory interface (5101) at the first edge of the system-on-chip (510). Furthermore, the buffer chip (521) is located at a location such that the second memory interface is coupled to a second set of surface contacts on the substrate (501) and coupled to the first circuit (5011). Thus, the second memory interface (5211) is configured to couple to the first memory interface (5101) via the first circuit (5011).

The method further includes a step of disposing two or more memory circuits (e.g., HBM die 531 and HBM die 532) laterally side-by-side or vertically one-on-another on the buffer circuit (521). Each memory circuit comprises a second number of data paths for data transfer and signal communication. The method additionally includes a step of forming a first number of data paths in the interposer substrate that aggregates a sum of the first number of data paths for each memory circuit. The first number of data paths couple to the second memory interface (5211) for communicating with the system-on-chip (510) via the connection circuit (5011) and further through the first memory interface (5101).

While the above is a full description of the specific embodiments, various modifications, alternative constructions and equivalents may be used. Therefore, the above description and illustrations should not be taken as limiting the scope of the subject technology which is defined by the appended claims.

What is claimed is:

1. A system comprising:
a substrate comprising a first circuit;
a second circuit formed in a first die disposed on the substrate, the second circuit comprising at least a processor and a first memory interface, the first memory interface being disposed in a first edge of the first die and being configured to couple the processor with the first circuit, the second circuit comprising a graphic processing unit (GPU);
a third circuit formed in a second die disposed on the substrate adjacent to the first edge of the first die, the third circuit comprising a second memory interface configured to couple to the first circuit; and
multiple memory modules disposed on the second die, each of the multiple memory modules at least partially sharing the second memory interface to communicate with the processor via the first circuit and the first memory interface.

2. The system of claim 1, wherein the second circuit comprises a central processing unit (CPU).

3. The system of claim 1, wherein the second circuit comprises an artificial intelligence (AI) accelerator.

4. The system of claim 1, wherein the first circuit comprises a connection interposer and a connection trace.

5. The system of claim 1, wherein the second circuit formed in the first die comprises a system-on-chip.

6. The system of claim 1, wherein the multiple memory modules comprise two or more memory dies being disposed laterally side-by-side and/or vertically one-on-another on the second die.

7. The system of claim 1, wherein the second circuit comprises a third memory interface disposed in a second edge of the first die.

8. The system of claim 7, further comprising a fourth circuit formed in a third die, the fourth circuit comprising a fourth memory interface, the third die being disposed on the substrate adjacent to the second edge of the first die, the substrate comprising a fifth circuit configured to couple the fourth memory interface with the third memory interface.

9. The system of claim 8, further comprising multiple memory modules disposed on the third die, the multiple memory modules at least partially sharing the fourth memory interface to communicate with the second circuit via the fifth circuit and the third memory interface.

10. The system of claim 1, wherein the first memory interface is configured to support 128 GB/s or higher bandwidth.

11. The system of claim 1, wherein the second memory interface comprises a number of data paths for communicating data, address, and control signals, wherein the number of data paths is smaller than a sum of data paths for the multiple memory modules and comprises a subset of data paths for commonly communicating with the multiple memory modules.

12. An integrated circuit comprising:
a substrate comprising a first circuit;
a second circuit comprising at least a first memory interface, the second circuit being configured to be a first die disposed on the substrate, wherein the first memory interface is configured to couple to the first circuit, the second circuit comprising an artificial intelligence (AI) accelerator;

a third circuit comprising a second memory interface, the third circuit being configured to be a second die disposed on the substrate adjacent to the first die, wherein the second memory interface is configured to couple to the first circuit; and multiple memory circuits disposed on the second die, each of the multiple memory circuits at least partially sharing the second memory interface to communicate with the second circuit via the first circuit and the first memory interface.

13. The integrated circuit of claim 12, wherein the first die is configured as a system-on-chip comprising at least one integrated circuit of CPU, GPU, artificial intelligence accelerator, computing system, networking system, and autonomous control system.

14. The integrated circuit of claim 12, wherein the multiple memory circuits comprise two or more memory modules being disposed laterally side-by-side and/or vertically one-on-another on the second die.

15. The integrated circuit of claim 12, wherein each of the multiple memory circuits comprises a high bandwidth memory (HBM) module capable of supporting 128 GB/s or higher bandwidth.

16. The integrated circuit of claim 12, wherein the second circuit comprises a third memory interface.

17. The integrated circuit of claim 16, further comprising a fourth circuit comprising a fourth memory interface, the fourth circuit being configured to be a third die disposed on the substrate adjacent to the first die, the substrate comprising a fifth circuit configured to couple the fourth memory interface to the third memory interface.

18. The integrated circuit of claim 17, further comprising multiple memory circuits disposed on the third die, each of the multiple memory circuits at least partially sharing the fourth memory interface to communicate with the second circuit via the fifth circuit and the third memory interface.

19. A method of coupling a system-on-chip circuit to separate memory circuits, the method comprising:
providing a substrate comprising a first circuit;
providing a second circuit comprising a first memory interface, the second circuit comprising a graphic processing unit (GPU);
disposing the second circuit on the substrate, the first memory interface being configured to couple to the first circuit;
providing at least a third circuit comprising a second memory interface, the second memory interface comprising a first number of data paths;
disposing the third circuit on the substrate, the third circuit being located adjacent to the second circuit, the second memory interface being configured to couple to the first circuit;
disposing two or more memory circuits laterally side-by-side or vertically one-on-another on the third circuit, each memory circuit comprising a second number of data paths; and
coupling the second number of data paths for each memory circuit to the first number of data paths in the second memory interface to allow each memory circuit communicating with the second circuit, the first number of data paths being smaller than a sum of the second number of data paths.

* * * * *